US006799031B1

(12) United States Patent
Lewiner et al.

(10) Patent No.: US 6,799,031 B1
(45) Date of Patent: Sep. 28, 2004

(54) LOCAL COMBINED TELEPHONE AND ALARM SYSTEM

(75) Inventors: Jacques Lewiner, Saint-Cloud (FR); Eric Carreel, Meudon (FR)

(73) Assignee: Inventel, Paris (FR)

( * ) Notice: Subject to any disclaimer, the term of this patent is extended or adjusted under 35 U.S.C. 154(b) by 311 days.

(21) Appl. No.: 09/980,409

(22) PCT Filed: Jun. 2, 2000

(86) PCT No.: PCT/FR00/01527

§ 371 (c)(1),
(2), (4) Date: Feb. 25, 2002

(87) PCT Pub. No.: WO00/75891

PCT Pub. Date: Dec. 14, 2000

(30) Foreign Application Priority Data

Jun. 3, 1999 (FR) .............................. 99 07005

(51) Int. Cl.[7] .............................................. H04B 11/04
(52) U.S. Cl. ............................... 455/404.1; 455/404.2; 455/41.2; 379/39; 379/40; 340/502; 340/504; 340/539.1
(58) Field of Search .......................... 455/404.1–404.2, 455/41.2; 379/37, 39–40; 340/502, 504, 514, 539.1, 539.24

(56) References Cited

U.S. PATENT DOCUMENTS

| 4,559,526 A | * | 12/1985 | Tani et al. | ................ | 340/539.3 |
| 4,993,059 A | * | 2/1991 | Smith et al. | ................... | 379/39 |
| 5,319,698 A | * | 6/1994 | Glidewell et al. | ............ | 379/39 |
| 5,327,478 A | * | 7/1994 | Lebowitz | ...................... | 379/40 |
| 5,805,064 A | * | 9/1998 | Yorkey | ........................ | 340/550 |
| 6,285,867 B1 | * | 9/2001 | Boling et al. | ............ | 455/404.1 |
| 6,711,399 B1 | * | 3/2004 | Granier | ................... | 455/404.1 |

FOREIGN PATENT DOCUMENTS

| CH | 676398 | 1/1991 | |
| DE | 44 08 972 | 4/1995 | |
| DE | 196 34 675 | 3/1998 | |
| EP | 0 817 147 | 1/1998 | |
| EP | 817147 A | * 1/1998 | .......... H04M/11/04 |
| WO | WO 96/12264 | 4/1996 | |
| WO | WO 97/13230 | 4/1997 | |

OTHER PUBLICATIONS

International Search Report dated Dec. 15, 2000, Appl. No. PCT/FR00/01527.
A. Carmine, "Multimedia Over DECT: The Enabling Technology for Multi–application Wireless Systems," *Philips Telecommunication Review,* vol. 52, No. 4, Oct., 1995 (pp. 9–11).
Moore, "Integrated Alarm System and Cordless Phone," *8182 Motorola Technical Developments,* vol. 11 (10/90), pp. 82–85, Schaumburg, IL.
Mobilfunk "Die Trennung von der Schnur macht Fortschritte", *NET* vol. 48 (1994), pp. 14–16.

* cited by examiner

*Primary Examiner*—William Trost
*Assistant Examiner*—Sharad Rampuria
(74) *Attorney, Agent, or Firm*—McCracken & Frank LLP

(57) ABSTRACT

The invention concerns a local combined telephone and an alarm system comprising a central base communicating through two-way radio channel, according to a multiple access communication protocol, with telephone stations and detectors adapted to detect an emergency situation. The base transmits at regular intervals of less than 10 minutes, scanning messages addressed to the detectors and determines whether the detectors are operating, depending on whether it receives clearance messages from the detectors.

14 Claims, 2 Drawing Sheets

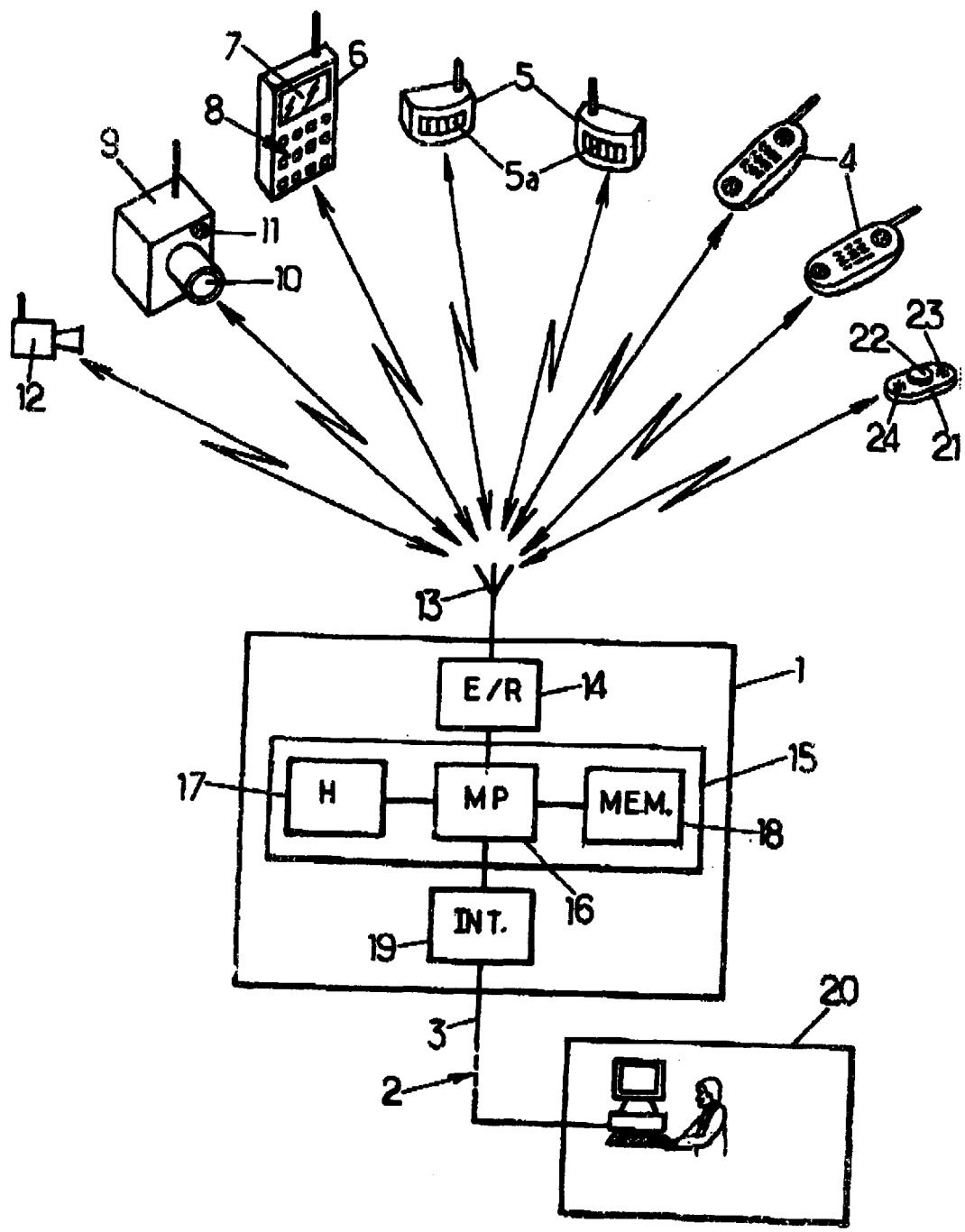

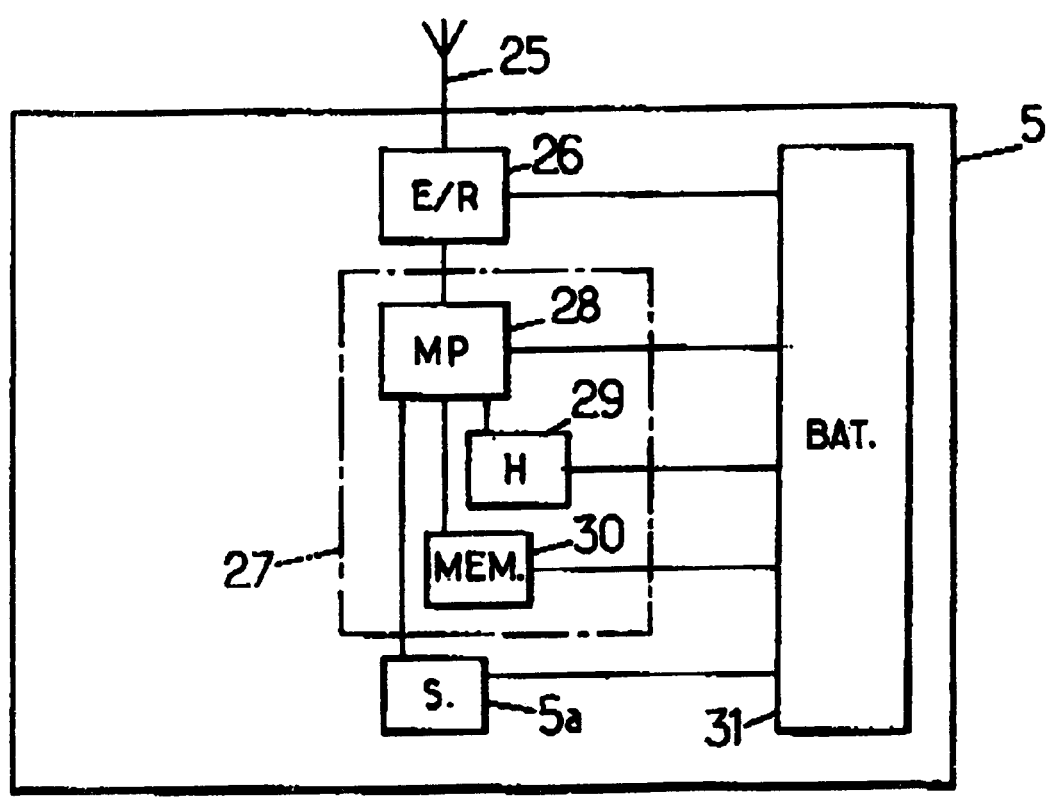

LOCAL COMBINED TELEPHONE AND ALARM SYSTEM

FIELD OF THE INVENTION

The present invention relates to local combined telephone and alarm systems.

More particularly, the invention concerns a local telephone and alarm system, including:

a central base comprising:
a) two-way radio communication means,
b) a central electronic unit adapted to make the radio communication means of the base work according to a local numeric communication protocol, this protocol being two-way and multiple access (in other words, this protocol allows the base, by emission and by reception, to communicate, "simultaneously" with several of its peripherals, this multiple access being notably obtained by time division [TDMA type protocols] and/or by multiple carrier frequencies, or also by spread spectrum),
c) and a link which allows communication with a public telephone network, and peripherals including at least one detector adapted to detect at least one predetermined emergency situation and to communicate by radio with the base according to said local communication protocol, this detector being adapted to send an alarm message to the base when it detects said emergency situation, and the central unit of the base being adapted to provoke at least one alarm reaction when it receives the alarm message from the detector, the central unit of the base being also adapted to communicate by radio with at least one telephone set (effectively present or not) according to the local communication protocol.

BACKGROUND OF THE INVENTION

An example of one such combined local telephone and alarm system, using the DECT communication protocol (notably defined by ETS 300 175-1 to ETS 300 175-9 norms, as decreed by ETSI) for the radio link between the base and the telephone sets and the detectors, was described by A. Carminé ("Multimedia over DECT: the enabling technology for multi-application wireless systems", Philips telecommunication review, vol. 52, N°4, October 1995, p 9–11).

One advantage of this system is to combine in the same apparatus, on the one hand, the central base functions of a local cordless telephone network, and on the other hand, the functions of an alarm central unit, leading to benefits in terms of cost savings and size. Furthermore, by the fact that the local communication protocol is multiple-access, the different units communicating with the base do not interfere with each other.

However, in its function as an alarm system, this currently known system displays an insufficient degree of reliability, in so far as no alarm message can reach the base if the detector is defective.

In particular, this situation may arise:
in the event of detector failure,
and, when it concerns an intrusion detector, if a burglar manages to destroy this detector before it has had time to send the alarm signal to the base.

OBJECTS AND SUMMARY OF THE INVENTION

The present invention aims notably to overcome this drawback.

To this end, according to the invention, a local combined telephone and alarm system of the type in question is characterized:

in that the base central unit is adapted to make the communication means of said base emit, at regular time intervals, scanning messages to the detector, in that the detector is adapted to send an acknowledgement message to the base each time it receives a scanning message, and in that the base central unit is adapted to check whether the base has successfully received the corresponding acknowledgement message for each scanning message, and to identify the defective detector and to activate at least one predetermined checking reaction if the acknowledgement message corresponding to a scanning message is not received by the base within a predetermined time period after the emission of said scanning message (this checking reaction is adapted to directly determine or provoke determination of whether the detector has simply broken down or if it is necessary to activate an alarm reaction).

Owing to, these dispositions, natural or provoked detector failures are rapidly identified by the base, which can then react in an appropriate way, for example:

by indicating this fault to a human operated surveillance station for checking the situation, and/or by directly checking whether several detectors have simultaneously become defective, so as to determine in this way if the alarm has to be activated immediately, etc.

In the preferred embodiments of the invention, one may possibly use one and/or other of the following dispositions:

the local communication protocol makes provision for time dividing the radio communications in frames themselves regrouped in sets of successive frames of predetermined duration, inferior to 1 s, each set of frames comprising, for each peripheral, a call time slot of duration much inferior to said predetermined duration, during the course of which the base is capable of emitting at least part of a call message to said receptor, at least the detector is electrically autonomous and is adapted to be either in an active state where said detector communicates with the central base, or in a stand-by state where said detector cannot communicate with said central base, the detector being adapted to remain in a stand-by state for the majority of time and go into an active state uniquely:

either when the detector's sensor detects said predetermined emergency situation or after every n sets of frames during the call time slot corresponding to said detector, n being an integer at least equal to 3, and the base is adapted to emit said scanning messages to the detector during n sets of successive frames;

the local communication protocol is the DECT protocol, the duration of each set of frames being 640 ms, and n being equal to 3;

the local combined telephone and alarm system furthermore comprises at least one telephone set adapted to radio communicate with the base according to the local communication protocol;

each scanning message sent by the base to the detector constitutes a request for establishment of two-way communication addressed specifically to said detector, the acknowledgement message sent back by the detector being constituted by the establishment of said two-way communication between the detector and the base;

each scanning message sent by the base to the detector constitutes a unilateral paging message addressed to all of the peripherals, containing a predetermined code requesting at least one detector to establish two-way communication with the base, the acknowledgement message sent back by the detector being constituted by the establishment of said two-way communication between said detector and the base;

each scanning message sent by the base to the detector consists in the establishment by said base, of two-way communication with this detector, the acknowledgement message sent back by the detector being constituted by at least one message received by the detector and confirming that said two-way communication has been successfully established;

the time intervals separating two scanning messages to the detector, are inferior to 3 minutes;

the base central unit is adapted to communicate with a tele-surveillance centre, said alarm and checking reactions each comprising the establishment of a communication link between the base and the tele-surveillance centre, and the central unit being adapted to, when it activates one of said alarm and checking reactions and when the public telephone network line is already in communication with other than the tele-surveillance centre, interrupt this communication: in this way the priority of communication with the tele-surveillance centre is guaranteed above all other communication, without having to carry out any other particular connection to the base, even when said base is connected with the public telephone network by wire;

the local combined telephone and alarm system furthermore comprises at least one visual surveillance aid which includes an electronic camera and which is adapted to communicate with the base by radio according to the local communication protocol, so that images can be captured and sent to said base, the base being adapted to re-transmit these messages to the tele-surveillance centre;

the local combined telephone and alarm system furthermore comprises at least one acoustic surveillance device which includes a microphone and which is adapted for radio communication with the base according to the local communication protocol, so that sounds can be captured and sent to said base, the base being adapted to re-transmit these sounds to the tele-surveillance centre;

the local combined telephone and alarm system includes several detectors, the base central unit being adapted to:

memorise detector failures as well as the times when they become defective, when said base central unit determines a detector as defective and activates the control reaction, check if any of the other detectors are defective, and in the affirmative, activate said alarm reaction in function of a number of defective detectors and the chronology of failures;

the local combined telephone and alarm system furthermore comprises an interface device allowing communication with a human operator, this interface device being adapted to communicate with the base central unit in accordance with the local communication protocol, and the base central unit being adapted in order to send break-down messages to this interface device each time a detector is determined as defective;

the system furthermore comprises a distress call portable unit which is adapted to communicate by radio with the base according to the local communication protocol and which includes a means for activating distress calls, a loudspeaker and a microphone.

BRIEF DESCRIPTION OF THE DRAWINGS

Other features and advantages of the invention will become clear from the following description of one embodiment thereof, given by way of non-limiting example, with reference to the accompanying drawings.

In the drawings:

FIG. 1 is a schematic view of a local combined telephone and alarm system according to one embodiment of the invention, and FIG. 2 is a block diagram of a detector in the local combined telephone and alarm system shown in FIG. 1.

MORE DETAILED DESCRIPTION

The local combined telephone and alarm system includes:

on the one hand, a central base 1 which is generally fixed and linked to the public telephone network 2 (public switched telephone network) by wire 3, the central base 1 however being if need be mobile and linked to the public telephone network 2 by a radio link (in all cases, the central base 1 communicates directly with the public network 2, according to this public network's own communication protocol, which is in general different from the protocol of local communication described hereafter).

and on the other hand, a plurality of fixed or mobile peripherals including, for example:

one or more portable telephones 4 several detectors, some of which 5 include sensors 5a adapted to detect emergency situations such as an intrusion, a fire, a flood etc., at least one of these detectors if need be comprising a distress call portable unit 21 which can be manually activated by a user by means of a button 22, this portable unit 21 advantageously comprising furthermore a loud speaker 23 and a microphone 24, an interface device 6 comprising for example a screen 7 and a keypad 8, or an acoustic emission means associated with a voice recognition device, one or more visual surveillance and/or acoustic devices, including an electronic camera and/or a microphone 11, one or more sirens 12, etc.

the central unit is adapted to communicate with each of its peripherals 4, 5, 6, 9, 12 by radio, according to a local two-way communication and multiple access protocol.

This local communication protocol is preferably the afore-mentioned DECT protocol, in which multiple-access, that is to say the "simultaneous" communication between the base and the different peripherals 4, 5, 6, 9, 12, 21) is obtained by time division and by multiple carrier frequencies. In variation, it would be equally possible to use the "Bluetooth" communication protocol elaborated in cooperation notably with the companies ERICSON, IBM, INTEL, NOKIA and TOSHIBA.

In order to allow this radio communication, the central unit 1 notably comprises, in the classical way:

an antenna 13 an electronic emission and reception device 14 (E/R) notably adapted to modulate and amplify electric signals sent to the antenna 13 and to amplify and demodulate radio signals received by said antenna, a central electronic unit 15 including for example a microprocessor or micro controller 16 (MP) linked to the electronic emission and reception device 14 as well as to a clock 17 (H) and a memory 18 (MEM.), the electronic central unit 15 if need be being able to form a single integrated circuit, and a communication interface 19 (INT.) linked to the telephone line 3.

Moreover, each of these peripherals 4, 5, 6, 9, 12 equally comprise, in a similar fashion to the base 1, an antenna, an electronic emission and reception device, and an electronic central unit including for example a microprocessor or micro controller linked to a clock and a memory.

The system which has just been described functions as follows (as a local telephone network the functioning of the system is classical, and will not be described here, it being understood that the same components in the base 1 at the same time ensure the functionality of a telephone and of a central alarm).

When one of the detectors 5 detects an emergency situation, it establishes a bi-directional link (two-way communication) by radio with the base 1 to send it an alarm message.

In turn, the base central unit 15 activates an alarm reaction such as for example the functioning of the siren 12 (radio operated) and/or the establishment of a link with a tele-surveillance centre 20 (having or not a human operator), through the telephone network 2.

Once this last link is established, the human operator present in the tele-surveillance centre 20 (if this centre is human operated) sends someone quickly to the site where the telephone and alarm system is located, and/or controls the situation remotely. In this regard, the central unit 15 can advantageously be programmed to provoke (by radio waves) the functioning of the surveillance device 9 in order to receive images and/or the sound captured by this surveillance device, and to retransmit these images and/or this sound to the tele-surveillance centre 20 (automatically or at the request of the tele-surveillance centre).

In order to guarantee the reliability of the system with regard to natural or provoked failures of the detectors 5 or 21, the base central unit 15 is adapted to check at regular time intervals, for example inferior to 10 minutes and preferably inferior to 3 minutes, indeed inferior to 1 minute, whether the detectors 5 are functioning correctly.

In order to achieve that, as a general rule, the base central unit 15 provokes, at regular time intervals, the emission of scanning messages from the base to the detectors 5, 21 and surveys the reception of acknowledgement messages from the detectors 5, 21 by said base.

With the DECT protocol, this message exchange can happen notably in one of the three following ways:

each scanning message sent by the base constitutes a request for the establishment of a two-way link addressed specifically to one detector, the acknowledgement message sent back by the detector being constituted by the establishment of said two-way communication by this detector and the base, each scanning message sent by the base constitutes a unilateral paging message addressed to all of the peripherals and contains a predetermined code requesting that at least detectors 5 and 21 simultaneously establish a two-way link with the base, the acknowledgement message sent back by each detector being constituted by the establishment of said two-way communication between this detector and the base, each scanning message sent by the base 1 consists directly in the establishment of a two-way link with a particular detector, the acknowledgement message sent back by this detector being constituted by at least one message acknowledging receipt (or by any other message received from the detector) confirming that said two-way link has been successfully established.

If the central unit 15 does not detect the acknowledgement message coming from one or more of the detectors 5, 21 within a predetermined time period (for example 1 s., indeed a lot less) following the emission of the corresponding scanning message:

it identifies this detector as failing and memorises the identity of this detector with the time the failure was identified, it can if necessary send a breakdown message by radio to the interface device 6, which can be subsequently consulted by a user, and it can furthermore activate a checking reaction which can consist notably in the establishment of a link between the base 1 and the tele-surveillance centre 20, which tele-surveillance centre can then (if human operated) either send someone quickly to the site, or control the situation remotely by the surveillance device intermediary 9, as previously indicated, in order to determine if an alarm reaction needs to be activated.

In addition to the establishment of a link with the tele-surveillance centre 20 or if need be rather than the establishment of this link, the checking reaction of the central unit 15 can if need be consist of:

controlling the state of all the detectors 5, 21 in the memory 18, if need be having remotely activated a checking to the detectors 5, 21 and which would not have been checked for a period superior to a predetermined period, for example for 5 minutes, then activating the afore-mentioned alarm reaction according to the number and chronology of identified failures, for example if it transpires that a predetermined number of detectors, for example 3 detectors, were identified as being defective in a period inferior to a predetermined period, for example 10 minutes.

Furthermore, in order to guarantee the priority of communication with the tele-surveillance centre above all other communication, the base central unit 15 is set up to cut off all telephone communication underway 3 (incoming or ongoing call) while it tries to communicate with the tele-surveillance centre 20.

Finally, the base 1 is preferably adapted for, when it receives a call from the portable unit 21 following activation of the unit's button 22, establishing a two-way vocal link between the unit 21 and the human operator in the tele-surveillance centre. Furthermore, this human operator can himself contact the person holding the unit 21, at regular time intervals, to make sure everything is alright (in the case of home medical care, for example).

As shown in FIG. 2, each detector 5 is composed of for example:

an antenna 25 an emission and reception circuit (E/R) 26 an electronic central unit 27 including a microprocessor or a micro controller (MP) 28 linked to the emission and reception circuit 26, a clock (H) 29 such as a real time clock linked to the microprocessor 28, and a memory (MEM.) 30 linked to the microprocessor 28, the sensor 5a, linked to the microprocessor 28, and a battery or rechargeable battery (BAT.) 31 adapted to electrically supply all components of the detector 5, so that this detector is electrically autonomous.

In order to economise the battery's energy 31, the structure of the DECT communication protocol is advantageous, for it makes provision for time division of radio communications in frames themselves regrouped in sets of frames ("super" frames) of predetermined duration T generally equal to 640 ms.

Each of these sets of frames is composed of one or more time frames, their duration being a lot inferior to the duration of the set of frames, during the course of which each detector 5 is able to receive at least part of a call message issued by the base 1 (during the time frame, the detector (5) can for example receive all or part of an address code which belongs to it and which indicates that the frames following the set of frames contain information destined for it).

These time frames are known in advance by the detector (5), so that this detector 5 can remain in a stand-by state for the majority of time where the emission/reception circuit 26 is deactivated and where the microprocessor 28 functions "at a reduced rate" so as to economise the battery 31 of the detector.

The microprocessor 28 is "activated", that is to say put back into a state of normal functioning, with a greater electrical consumption:

by the sensor 5a, if an emergency situation is detected (for example an intrusion), and by the real time clock 29, at predetermined times corresponding to the afore-mentioned time frames where the detector 5 is able to receive a call message from the central unit 1, the activation of the microprocessor 28 by the clock 29 only however being carried out for one or more time frame calls after every n set of frames, n being at least equal to 3.

Advantageously, n is equal to 3, so that the detector's 5 microprocessor 24 is active every 1.92 s.

As soon as the microprocessor 24 is in an active state, it puts the emission/reception circuit 22 back into an active state, so that radio messages may be emitted and received.

What is claimed is:

1. Combined telephone and alarm system, comprising:

a central base including:
a) two-way radio communication means,
b) a central electronic unit adapted to make the radio communication means of the base work according to a numeric local communication protocol, this protocol being two-way and multiple access,
c) and a link which allows communication with a public telephone network, and peripherals including at least one detector equipped with a sensor adapted to detect at least one predetermined emergency situation and to communicate with the base by radio according to said local communication protocol, this detector being adapted to send an alarm message to the base when it detects said emergency situation, and the central unit of the base being adapted to provoke at least one alarm reaction when it receives the alarm message from the detector, the central unit of the base being also adapted to communicate by radio with at least one telephone set according to the local communication protocol, wherein the base central unit is adapted to make the communication means of said base emit, at regular time intervals, scanning messages to the detector, wherein the detector is adapted to send an acknowledgement message to the base each time it receives a scanning message, and wherein the base central unit is adapted to check whether the base has successfully received the corresponding acknowledgement message for each scanning message, and to identify the defective detector and activate at least one predetermined checking reaction if the acknowledgement message corresponding to a scanning message is not received by the base within a predetermined time period after the emission of said scanning message.

2. System according to claim 1, in which:

the local communication protocol makes provision for time dividing the radio communications in frames themselves regrouped in sets of successive frames of predetermined duration, inferior to 1 s, each set of frames comprising, for each peripheral, a call time slot duration much inferior to said predetermined duration, during the course of which the base is capable of emitting at least part of a call message to said receptor, at least the detector is electrically autonomous and is adapted to be either in an active state where said detector communicates with the central base, or in a stand-by state where said detector cannot communicate with said central base, the detector being adapted to remain in a stand-by state for the majority of time and go into an active state uniquely:

either when the detector's sensor detects said predetermined emergency situation, or after every n sets of frames during the call time slot corresponding to said detector, n being an integer at least equal to 3, and the base is adapted to emit said scanning messages to the detector during n sets of successive frames.

3. System according to claim 2, in which the local communication protocol is the DECT protocol, the duration of each set of frames being 640 ms, and n being equal to 3.

4. System according to claim 1, including in addition at least one telephone set adapted to radio communicate with the base according to the local communication protocol.

5. System according to claim 1, in which each scanning message sent by the base to the detector constitutes a request for establishment of two-way communication addressed specifically to said detector, the acknowledgement message sent back by the detector being constituted by the establishment of said two-way communication between the detector and the base.

6. System according to claim 1, in which each scanning message sent by the base to the detector constitutes a unilateral paging message addressed to all the peripherals, containing a predetermined code asking at least one detector to establish two-way communication with the base, the acknowledgement message sent back by the detector being constituted by the establishment of said two-way communication between said detector and the base.

7. System according to claim 1, in which each scanning message sent by the base to the detector consists in the establishment by said base, of two-way communication with this detector, the acknowledgement message sent back by the detector being constituted by at least one message received by the detector and confirming that said two-way communication has been successfully established.

8. System according to claim 1, in which the time intervals separating two scanning messages to the detector, are inferior to 3 minutes.

9. System according to claim 1, in which the base central unit is adapted to communicate with a tele-surveillance centre, said alarm and checking reactions each comprising the establishment of a communication link between the base and the tele-surveillance centre, and the central unit being adapted to, when it activates one of said alarm or checking reactions and when the public telephone network line is already in communication with other than the tele-surveillance centre, interrupt this communication.

10. System according to claim 9, comprising in addition at least one visual surveillance device which includes an electronic camera and which is adapted to communicate with the base by radio according to the local communication protocol, so that images can be captured and sent to said base, the base being adapted to re-transmit these messages to the tele-surveillance centre.

11. System according to claim 9, furthermore comprises at least one acoustic surveillance device which includes a microphone and which is adapted for radio communication with the base according to the local communication protocol, so that sounds can be captured and sent to said base, the base being adapted to re-transmit these sounds to the tele-surveillance centre.

12. System according to claim 1, comprising several detectors, the base central unit being adapted to:

memorise detector failures as well as the times when they become defective, when said base central unit identifies a detector as defective and activates the control reaction, check if any of the other detectors are defective, and in the affirmative, activate said alarm reaction in function of a number of defective detectors and a chronology of failures.

13. System according to claim 1, furthermore comprising an interface device allowing communication with a human operator, this interface device being adapted to communicate with the base central unit in accordance with the local communication protocol, and the base central unit being adapted to send break-down messages to this interface device each time a detector is identified as defective.

14. System according to claim 1, further comprising a distress call portable unit which is adapted to communicate by radio with the base according to the local communication protocol and which includes means for activating a distress call, a loud speaker and a microphone.

* * * * *